US005284325A

United States Patent [19]

[11] Patent Number: 5,284,325

[45] Date of Patent: Feb. 8, 1994

Sasaki et al.

[54] HOIST WITH LOAD SHIFTED GEAR, DETECTOR, AND MOTOR SPEED CHANGER

[75] Inventors: Masatoshi Sasaki, Kofu; Masahiko Mochizuki, Minamikoma, both of Japan

[73] Assignee: Kabushiki Kaisha Kito, Yamanashi, Japan

[21] Appl. No.: 853,475

[22] Filed: Mar. 18, 1992

[30] Foreign Application Priority Data

Apr. 22, 1991 [JP] Japan .................................. 3-116550
Dec. 13, 1991 [JP] Japan .................................. 3-351332

[51] Int. Cl.[5] .......................... B66D 1/58; B66D 1/24; B66D 3/26; F16H 1/08

[52] U.S. Cl. ..................................... 254/274; 254/342; 254/362; 74/412 TA; 318/434

[58] Field of Search ............... 254/274, 362, 168, 372, 254/342, 374; 74/665 GD, 458, 335; 192/150; 318/475, 434

[56] References Cited

U.S. PATENT DOCUMENTS

| | | | |
|---|---|---|---|
| 2,300,343 | 10/1942 | Clay | 254/173 |
| 2,836,085 | 5/1958 | Snyder | 254/342 X |
| 2,908,853 | 10/1959 | Laky et al. | 318/475 |
| 3,038,576 | 6/1962 | Simpson | 192/150 |
| 3,285,573 | 11/1966 | Hanawa et al. | 254/362 X |
| 3,339,426 | 9/1967 | Borggräfe | 74/412 R X |
| 3,564,372 | 2/1971 | Vogelsberg et al. | 318/434 X |
| 3,675,751 | 7/1972 | Fortner | 192/150 |
| 3,784,165 | 1/1974 | Pruitt | 254/342 |
| 3,887,855 | 6/1975 | Klimo | 318/434 X |
| 4,103,873 | 8/1978 | Sato et al. | 254/168 |
| 4,282,776 | 8/1981 | Eller | 74/337 X |
| 4,428,249 | 1/1984 | Henk | 74/412 TA |
| 4,555,093 | 11/1985 | Plummer | 254/362 |
| 4,636,962 | 1/1987 | Broyden et al. | 364/487 |
| 4,974,814 | 12/1990 | Cundy | 254/342 X |

FOREIGN PATENT DOCUMENTS

| | | |
|---|---|---|
| 0042801 | 12/1981 | European Pat. Off. . |
| 0246664 | 11/1987 | European Pat. Off. . |
| 2714452 | 10/1977 | Fed. Rep. of Germany . |
| 2635612 | 2/1978 | Fed. Rep. of Germany . |
| 2547807 | 12/1984 | France . |
| 48-31758 | 4/1973 | Japan . |
| 52-121257 | 10/1977 | Japan . |
| 53-19964 | 2/1978 | Japan . |
| 57-38294 | 3/1982 | Japan . |

OTHER PUBLICATIONS

Yan-Wen Huang, "Automatic Control", pp. 80-85 Wen-Jing Book Co. Ltd. Feb. 10, 1991).

*Primary Examiner*—Clifford D. Crowder
*Assistant Examiner*—Ismael Izaguirre
*Attorney, Agent, or Firm*—Pennie & Edmonds

[57] ABSTRACT

An electric hoist comprising an electric motor and a sheave driven by the electric motor via a reduction gear. The reduction gear comprises a pair of helical gears meshing with each other. One of the helical gears is axially movably arranged on a shaft and is moved in the axial direction thereof when there is a load on the load chain supported by the sheave, and when the axial movement of the movable helical gear is detected by a sensor, the speed of rotation of the electric motor is automatically changed from a higher speed to a lower speed.

23 Claims, 12 Drawing Sheets

HOIST WITH LOAD SHIFTED GEAR, DETECTOR, AND MOTOR SPEED CHANGER

BACKGROUND OF THE INVENTION

1. Field of the Invention

The present invention relates to an electric hoist

2. Description of the Related Art

In an electric hoist, preferably the lifting speed and the lowering speed of the hoist can be made lower when a load is lifted by the hoist, to thereby prevent an impact of the load with a surrounding member such as a floor, at a high speed, and the lifting speed and the lowering speed of the hoist can be increased under a no-load state, to thereby quickly lift or lower the hook of the hoist to a target position.

In a known electric hoist, the upper end of the wire rope for lifting a load is supported by a spring-loaded movable member, and a detecting switch cooperating with the spring-loaded movable member is provided for detecting whether or not there is a load on the hook of the wire rope. When it is detected by the detecting switch that there is a load on the hook, the lifting speed and the lowering speed of the hoist are made lower, and when it is detected by the detecting switch that there is no load on the hook, the lifting speed and the lowering speed of the hoist are increased (see Japanese Unexamined Patent Publication No. 57-38294).

This type of electric hoist, however, requires additional special members, such as the spring-loaded movable member, to detect whether or not there is a load on the hook, and thus a problem arises in that the size of the hoist becomes large, and the cost of manufacturing the hoist is increased.

SUMMARY OF THE INVENTION

An object of the present invention is to provide an electric hoist capable of automatically changing the lifting speed and the lowering speed thereof, without largely modifying the construction of the hoist According to the present invention, there is provided an electric hoist comprising an electric motor having an output shaft; a driven shaft for lifting and lowering a load; a reduction gear arranged between the output shaft and the driven shaft and having at least two helical gears meshing with each other, one of the helical gears being movable in an axial direction thereof when the load exceeds a predetermined value; detecting means for detecting the movement of the movable helical gear; and control means for controlling the rotating speed of the electric motor in response to an output signal of the detecting means, to thereby change the rotating speed of the electric motor from a higher speed to a lower speed when the weight of the load exceeds a predetermined value.

The present invention may be more fully understood from the description of preferred embodiments of the invention set forth below, together with the accompanying drawings.

BRIEF DESCRIPTION OF THE DRAWINGS

In the drawings:

FIG. 1 is a partial cross-sectional side view of an electric hoist;

DESCRIPTION OF PREFERRED EMBODIMENT

Figure 2:
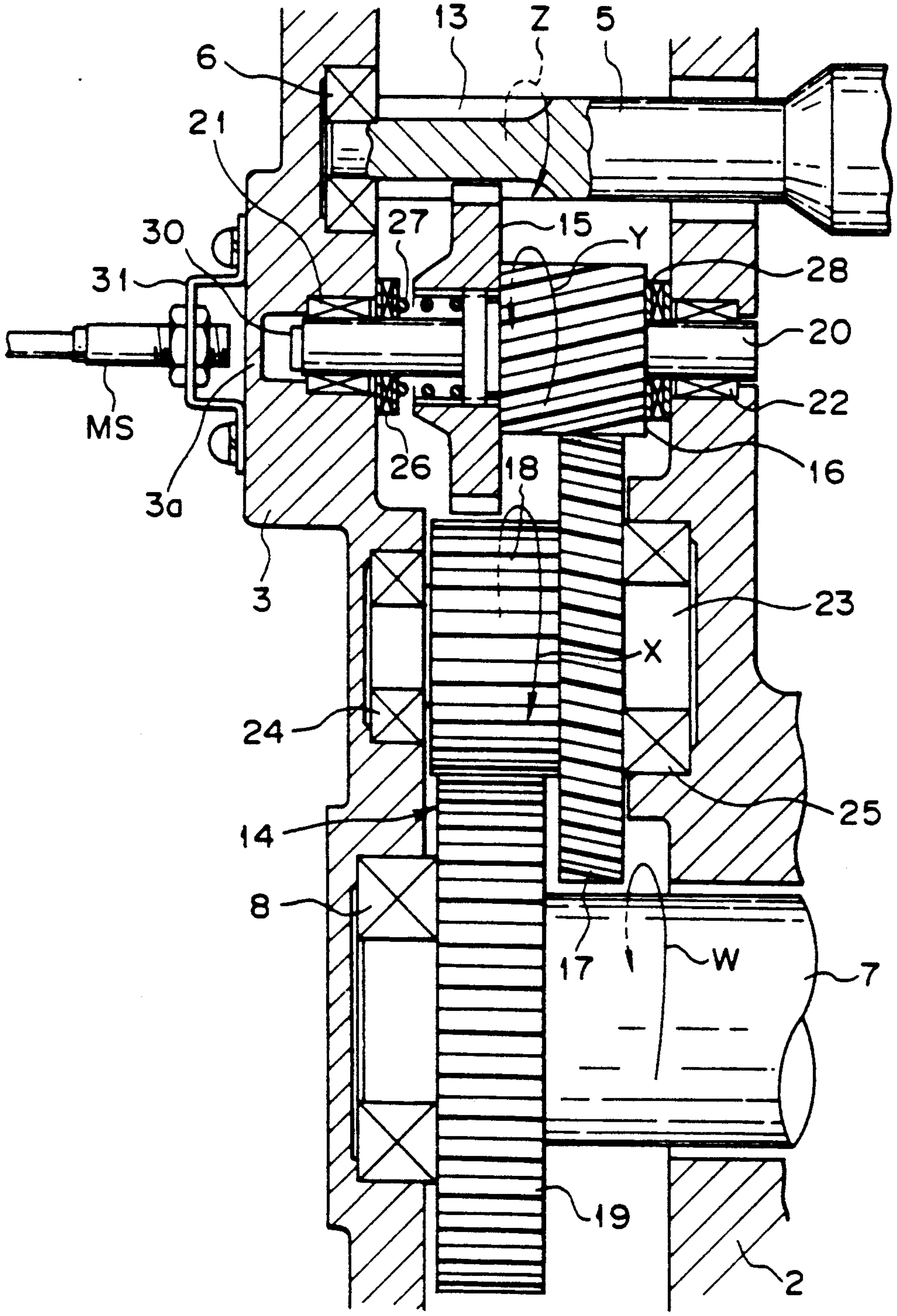
FIG. 2 is an enlarged cross-sectional side view of a portion of the hoist illustrated in FIG. 1.
Figure 2:
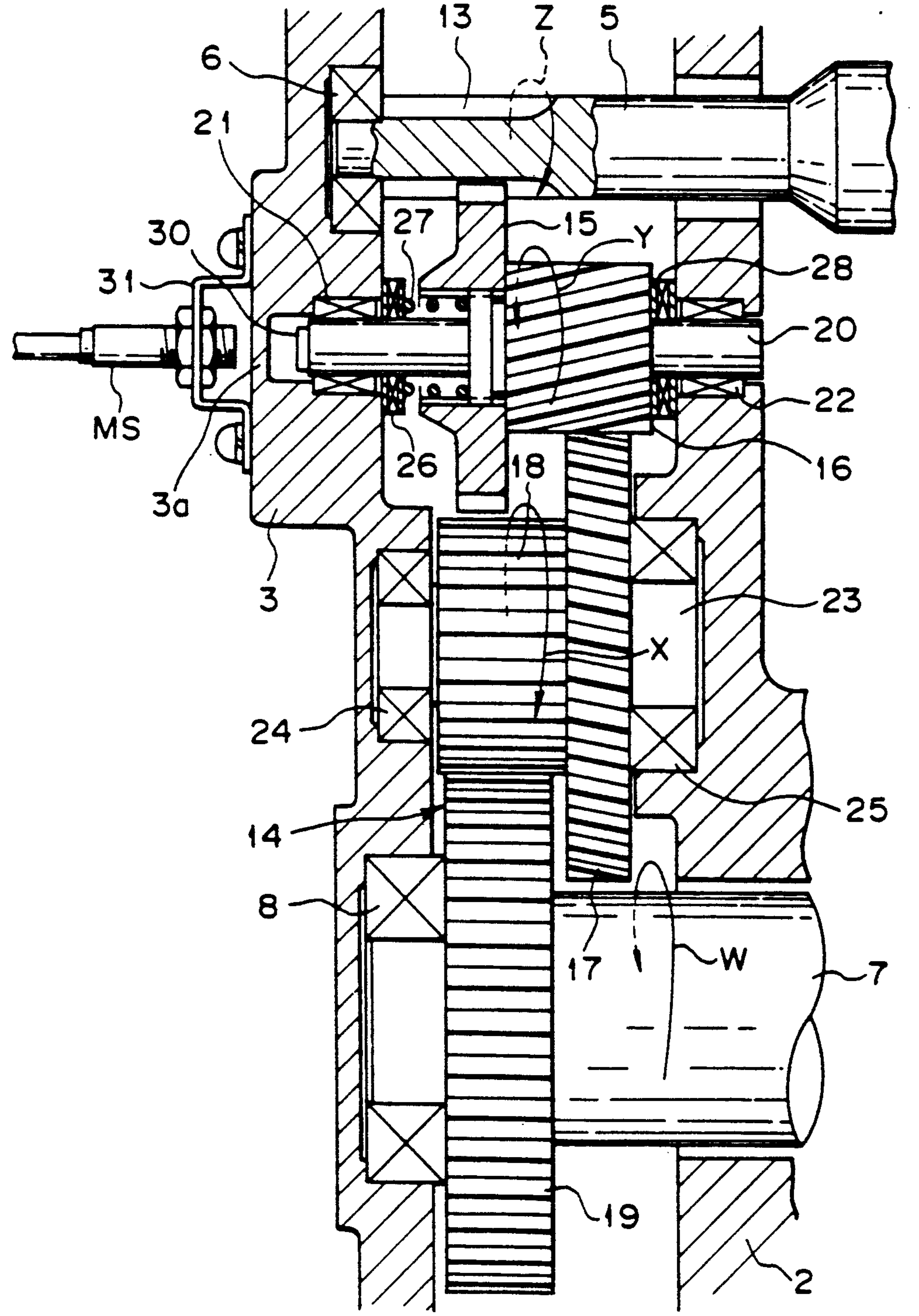
Figure 3:
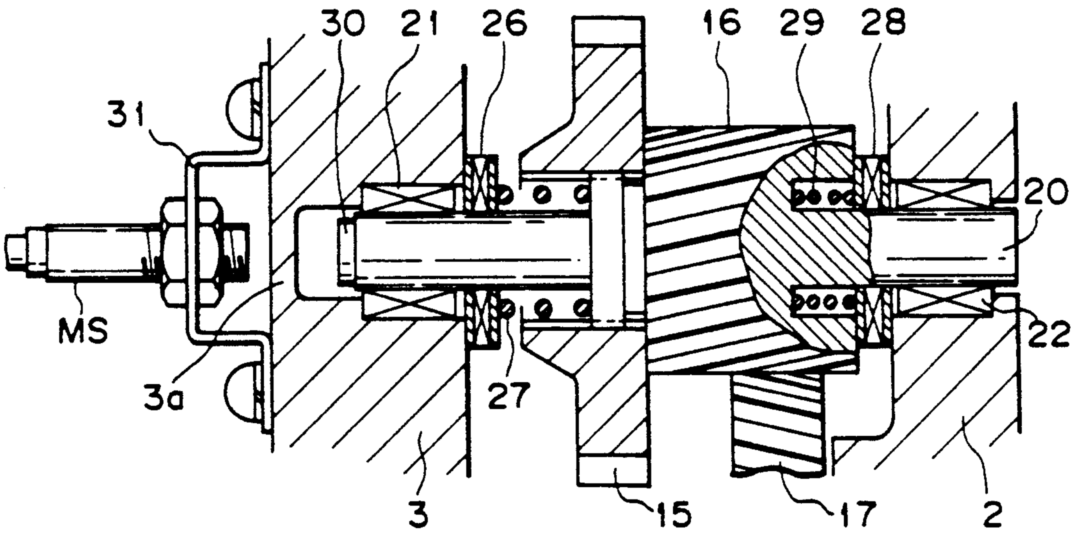
FIG. 3 is an enlarged cross-sectional side view of a portion of the hoist illustrated in FIG. 1.

Referring to FIGS. 1 through 3, reference numeral 1 designates an electric hoist, 2 an inner casing of the hoist 1, 3 an outer casing of the hoist 1, and 4 an electric motor; 5 designates an output shaft of the electric motor 4, which is supported by a bearing 6, 7 a driven shaft rotatably supported by a pair of bearings 8 and 9, 10 a seal ring, and 11 a load sheave fixed to the driven shaft 7. A schematically illustrated load chain 12 extends around the load sheave 11 in such a manner that the load chain 12 moves up and down when the load sheave 11 is rotated.

The output shaft 5 of the electric motor 4 has a gear portion 13, and a reduction gear 14 is arranged between the driven shaft 7 and the gear portion 13 of the output shaft 5. This reduction gear 14 comprises a first pair of gears 15 and 16, a second pair of gears 17 and 18, and a third gear 19 fixed on the driven shaft 7. The first pair of the gears 15 and 16 is fixed on an intermediate shaft 20 rotatably supported by a pair of bearings 21 and 22, and the second pair of the gears 17 and 18 is fixed on another intermediate shaft 23 rotatably supported by a pair of bearings 24 and 25. As can been seen from FIGS. 1 and 2, the intermediate shafts 20 and 23 and the driven shaft 7 are arranged in parallel to the output shaft 5 of the electric motor 4.

The gear 15 of the first pair is meshed with the gear portion 13 of the output shaft 5, and the gear 16 of the first pair is meshed with the gear 17 of the second pair. Furthermore, the gear 18 of the second pair is meshed with the gear 19 of the driven shaft 7. As illustrated in FIGS. 1 and 2, the diameter of the gear portion 13 of the output shaft 5 is smaller than that of the gear 15 of the first pair, and the diameter of the gear 16 of the first pair is smaller than that of the gear 17 of the second pair. Also, the diameter of the gear 18 of the second pair is smaller than that of the gear 19. Accordingly, when the output shaft 5 is rotated, the first stage of a speed reduction operation is carried out between the gear portion 13 of the output shaft 5 and the gear 15 of the first pair; the second stage of a speed reduction operation is carried out between the gear 16 of the first pair and the gear 17 of the second pair; and the third stage of a speed reduction operation is carried out between the gear 17 of the second pair and the gear 19 of the driven shaft 7.

The output shaft 5, the intermediate shaft 23 of the second pair and the driven shaft 7 are supported by the corresponding bearings 6, 24, 25, 8, 9 such that they cannot move in the axial direction thereof, but the intermediate shaft 20 is supported by the bearings 21, 22 such that it is able to move in the axial direction thereof. Further, the gear portion 13, the gear 15 of the first pair, the gear 18 of the second pair and the gear 19 are formed by a spur gear, but the gear 16 of the first pair and the gear 17 of the second pair are formed by a helical gear. As illustrated in FIGS. 2 and 3, a thrust bearing 26 is arranged between the outer casing 3 and the spur gear 15, and a compression spring 27 is inserted between the thrust bearing 26 and the enlarged portion of the intermediate shaft 20. Furthermore, a thrust bearing 28 is arranged between the inner casing 2 and the helical gear 16, and a compression spring 29 is inserted between the thrust bearing 28 and the helical gear 16. In the embodiment illustrated in FIGS. 1 through 3, these compression springs 27 and 29 are formed such that the compression spring 27 has a stronger spring force than that of the compression spring 29

Figure 4:
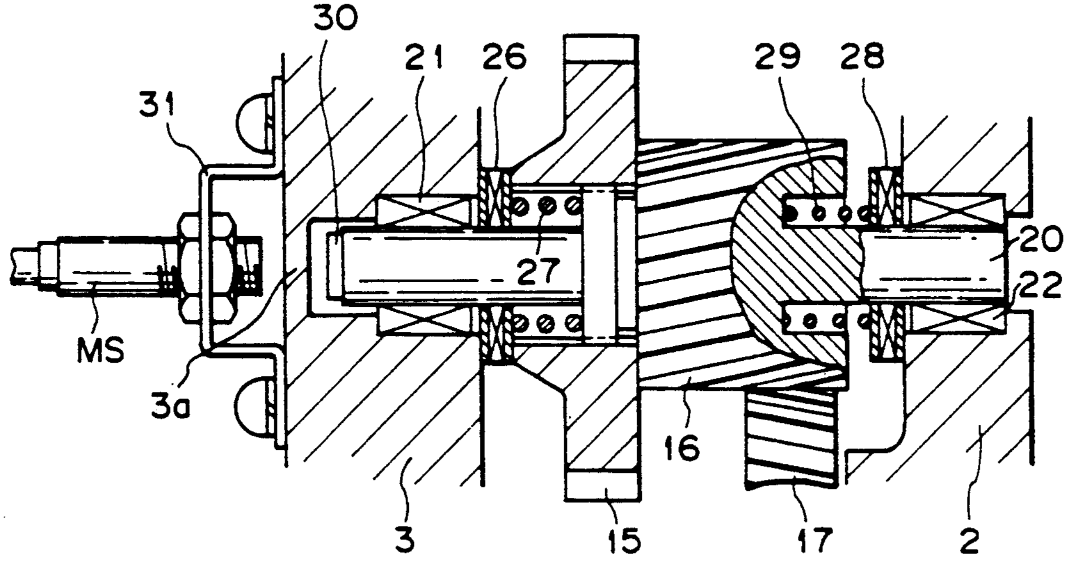
FIG. 4 is a cross-sectional side view of a portion of the hoist, illustrating the movement of the shaft.

When a load is hung on the load chain 12, forces causing each shaft 7, 23, 20, 5 to rotate act on each shaft, and in FIG. 2 the arrows W, X, Y and Z indicate the direction of rotation of the shafts 7, 23, 20, 5 when rotated by such forces When these forces are produced, a force causing the intermediate shaft 20 to move toward the thrust bearing 27 is imposed on the helical gear 16 by the helical gear 17. Namely, the direction of helical teeth of the helical gears 16 and 17 is predetermined so that, when these forces are produced, a force causing the intermediate shaft 20 to move toward the thrust bearing 27 is imposed on the helical gear 16 by the helical gear 17. At this time, if a force causing the intermediate shaft 20 to move toward the thrust bearing 27 is greater than a predetermined force determined by the compression springs 27, 29, the intermediate shaft 20 is caused to move toward the thrust bearing 26, against the force of the compression spring 27, to a position at which the spur gear 15 abuts against the thrust bearing 27, as illustrated in FIG. 4. Namely, if a load is hung on the load chain 12, the intermediate shaft 20 moves towards the thrust bearing 27. Conversely, if no load is hung on the load chain 12, the intermediate shaft 20 is maintained at a position at which the helical gear 16 is in contact with the thrust bearing 28, as illustrated in FIG. 3. Accordingly, it is possible to determine whether or not a load is hung on the load chain 12, from the movement of the intermediate shaft 20.

In the embodiment illustrated in FIG. 1 through 3, to detect the movement of the intermediate shaft 20, a permanent magnet 30 is fixed to the end face of the intermediate shaft 20, and a sensor MS, which is sensitive to the intensity of the magnetic field produced by the permanent magnet 30, is arranged outside of the outer casing 3. The sensor MS is supported by the outer casing 3 via a stay 31, and arranged to face the permanent magnet 30 via the thin walled portion 3*a* of the outer casing 3. Furthermore, in this embodiment, the outer casing 3 is made of a non-magnetic material so that the magnetic field produced by the permanent magnet 30 is able to act on the sensor MS.

Various sensors can be used as the sensor MS. For example, a reed contact type sensor having two reed contacts can be used as the sensor MS. In this case, one of the contacts is normally open and the other is closed when the permanent magnet 30 approaches the sensor 30, and the one of the contacts is normally closed and the other is open when the permanent magnet 30 approaches the sensor MS.

Figure 5:
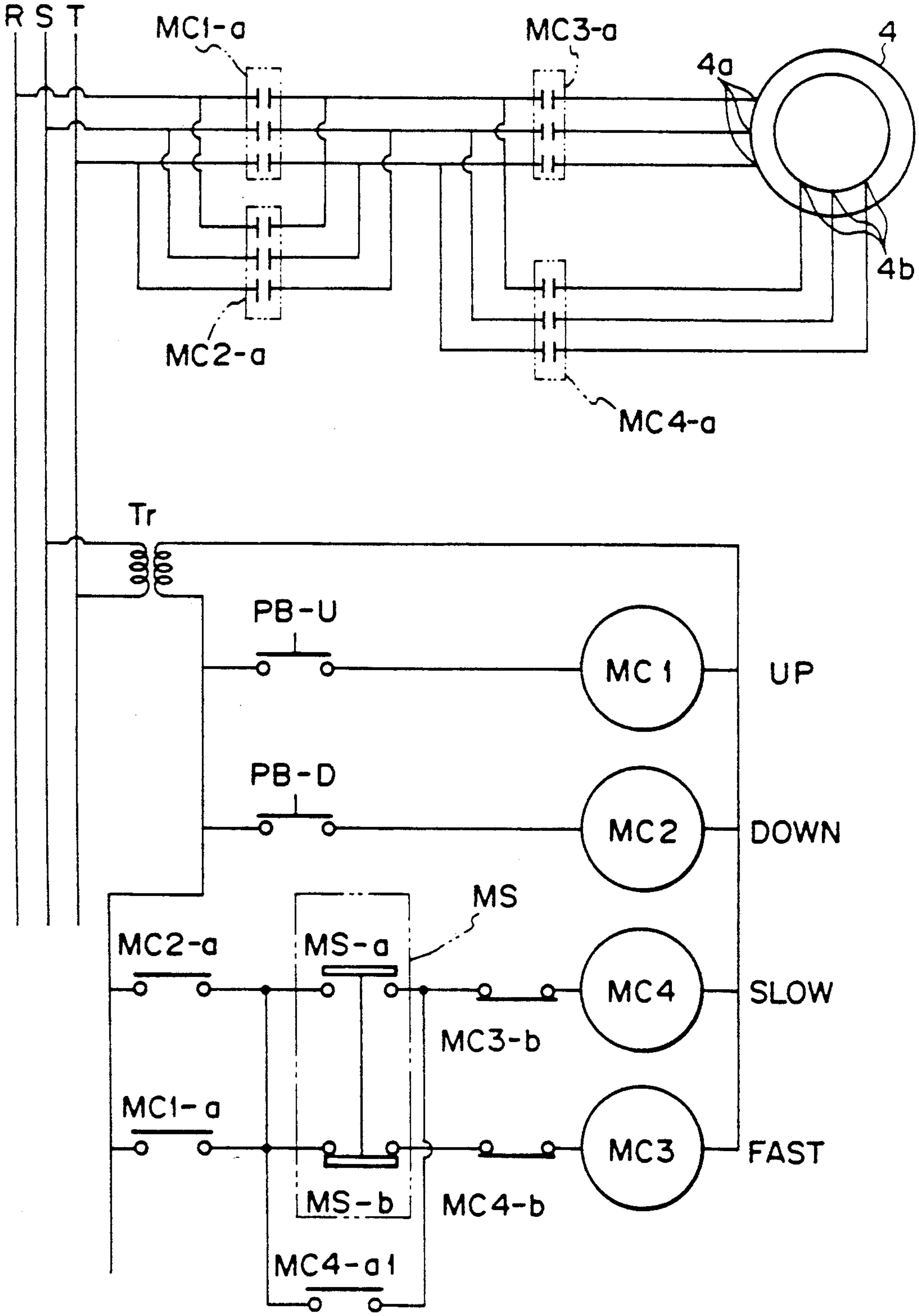
FIG. 5 is a circuit diagram for driving the electric motor.

FIG. 5 illustrates a circuit diagram for controlling the electric motor 4, wherein such a reed contact type sensor is used as the sensor MS.

Referring to FIG. 5, a transformer Tr having a primary coil connected to the power lines S, T is provided for dropping a voltage. An UP push button switch PB-U and an UP relay MC1 are connected in series between the opposed end of the secondary coil of the transfomer Tr, and a DOWN push button switch PB-D and a DOWN relay MC2 are connected in series between the opposed ends of the secondary coil of the transformer Tr. Also, a normally open contact MC2-a of the relay MC2, a normally open contact MS-a of the sensor MS, a normally closed contact MC3-b of a FAST relay MC3, and a SLOW relay MC4 are connected in series between the opposed ends of the secondary coil of the transfomer Tr. Furthermore, a normally open contact MC1-a of the UP relay MC1, a normally closed contact MS-b of the sensor MS, a normally closed contact MC4-b of the SLOW relay MC4, and the FAST relay MC3 are connected in series between the opposed end of the secondary coil of the transformer Tr.

Further, the SLOW relay MC4 has a normally open self-retaining contact MC4-al connected at one end between the contact MC2-a and the contact MS-a, and between the contact MC1-a and the contact MS-b, and the other end of this contact MC4-al is connected between the contact MS-a and the contact MC3-b.

In the embodiment illustrated in FIG. 5, the electric motor 4 is a motor in which the rotation speed can be changed by changing the number of poles from two poles to four poles and vice versa. The high speed input terminals 4*a* of the electric motor 4 are connected to the power lines R, S, T via a normally open contact MC3-a of the FAST relay MC3 and via a normally open contact MC1-a of the UP relay MC1 or a normally open contact MC2-a of the DOWN relay MC2. Also, the low speed input terminals 4*b* of the electric motor 4 are connected to the power lines R, S, T via a normally open contact MC4-a of the SLOW relay MC4 and via the normally open contact MC1-a of the UP relay MC1 or the normally open contact MC2-a of the DOWN relay MC2.

When there is no load on the load chain 12, the contact MS-a of the sensor MS remains open, and the contact MS-b of the sensor MS remains closed, as illustrated in FIG. 5. At this time, when the push button switch PB-U is pushed down, since the exciting coil of the UP relay MC1 is energized, the normally open contacts MC1-a are made ON. If the normally open contacts MC1-a are made ON, since the exciting coil of the FAST relay MC3 is energized, the normally open contacts MC3-a are made ON, and the normally closed contact MC3-b is made OFF. As a result, since the high speed input terminals 4*a* of the electric motor 4 are connected to the power lines R, S, T, the electric motor 4 is rotated at a high speed in a direction causing the hook of the load chain 12 to be moved upward.

If there is a load on the load chain 12 during a time for which the load chain 12 is moved upward, the intermediate shaft 20 is moved toward the sensor MS until the spur gear 15 abuts against the thrust bearing 26. As a result, the normally open contact MS-a of the sensor MS is made ON, and the normally closed contact MS-b of the sensor MS is made OFF. If the normally closed contact MS-b of the sensor MS is made OFF, since the exciting coil of the FAST relay MC3 is deenergized, the normally open contacts MC3-a are made OFF, and the normally closed contact MC3-b is made ON. At this time, as mentioned above, since the normally open contact MS-a of the sensor MS is ON, the exciting coil of the SLOW relay MC4 is energized. As a result, since the normally open contacts MC4-a are made ON, the low speed input terminals 4b of the electric motor 4 are connected to the power lines R, S, T, and thus the electric motor 4 is rotated at a low speed in a direction causing the hook of the load chain 12 to be moved upward. Namely, when there is a load on the load chain 12, the lifting speed of the load chain 12 is automatically changed from a high speed to a low speed.

Further, when the exciting coil of the SLOW relay MC4 is energized, the normally open self-retaining contact MC4-al is made ON. Accordingly, even if the intermediate shaft 20 is moved backward after the spur gear 15 has abutted against the thrust bearing 26, and thus the normally open contact MS-a of the sensor MS is made OFF, since the exciting coil of the DOWN relay MC4 remains energized, the electric motor 4 continues to be rotated at a low speed.

When the push button switch PB-D is pushed down, since the exciting coil of the DOWN relay MC2 is energized, the normally open contacts MC2-a are made ON. At this time, if there is no load on the hook of the load chain 12, the normally open contacts MC3-a are made ON, and thus the electric motor 4 is rotated at a high speed in a direction causing the load chain 12 to be moved downward. Conversely, if there is a load on the load chain 12, since the normally open contacts MC4-a are made ON, the electric motor 4 is rotated at a low speed in a direction causing the load chain 12 to be moved downward. Accordingly, when there is a load on the load chain 12, the lowering speed of the load chain 12 is automatically changed from a high speed to a low speed.

Figure 6:
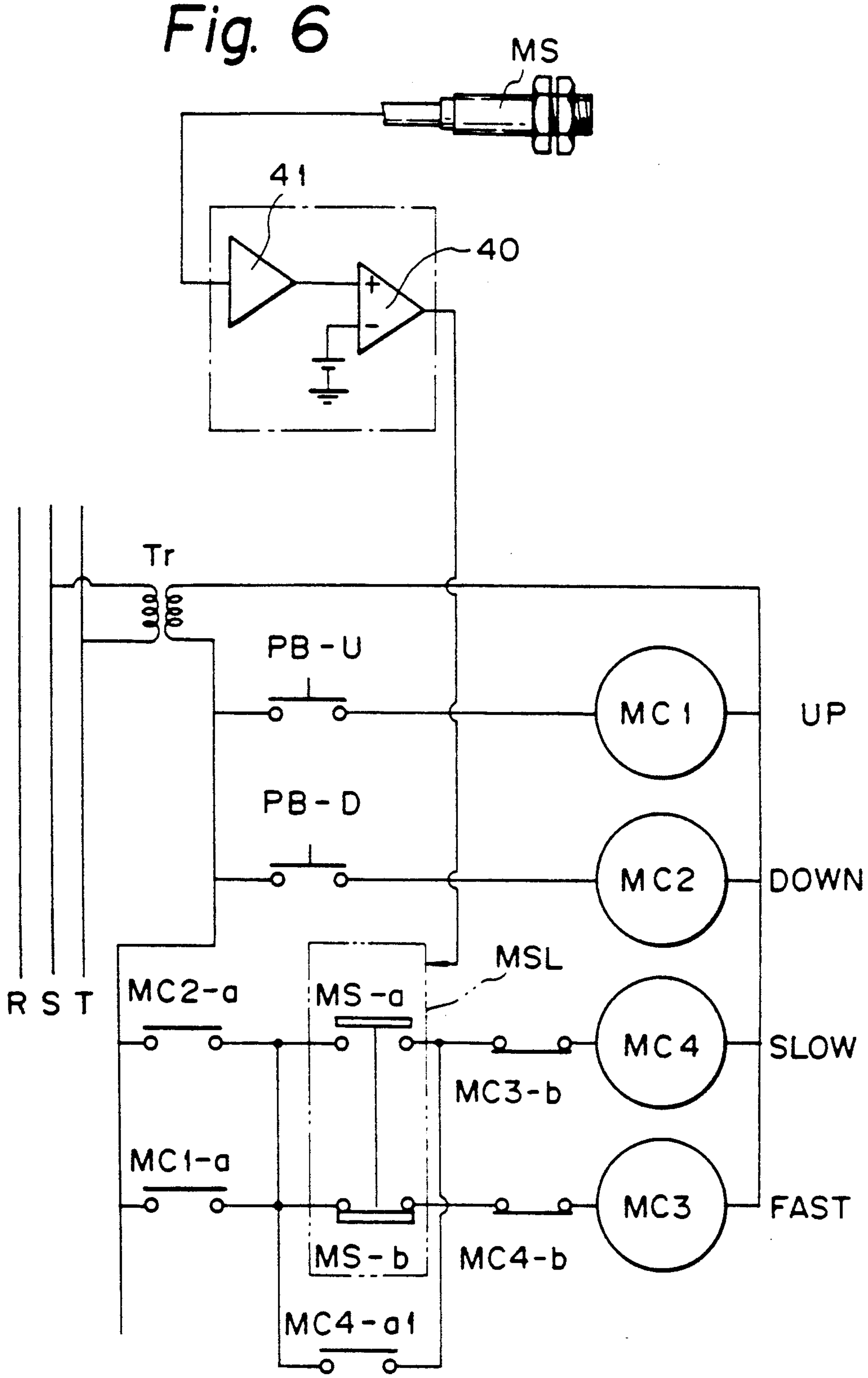
FIG. 6 is a circuit diagram of an alternative embodiment for driving the electric motor.

FIG. 6 illustrates the case where a Hall element is used as the sensor MS. In this case, the sensor MS produces an output voltage proportional to the intensity of the magnetic field. The output voltage of the sensor MS is applied to the non-inverting terminal of a comparator 40 via an amplifier 41, and the contacts MS-a and MS-b of a relay MSL are controlled by the output voltage of the comparator 40. In this case, when there is no load on the load chain 12, the output voltage of the sensor MS is at a low level, and at this time, the contact MS-a is OFF and the contact MS-b is ON, as illustrated in FIG. 6. Conversely, when there is a load on the load chain 12, since the output voltage of the sensor MS becomes high, the contact MS-a is made ON and the contact of the MS-b is made OFF.

Figure 7:
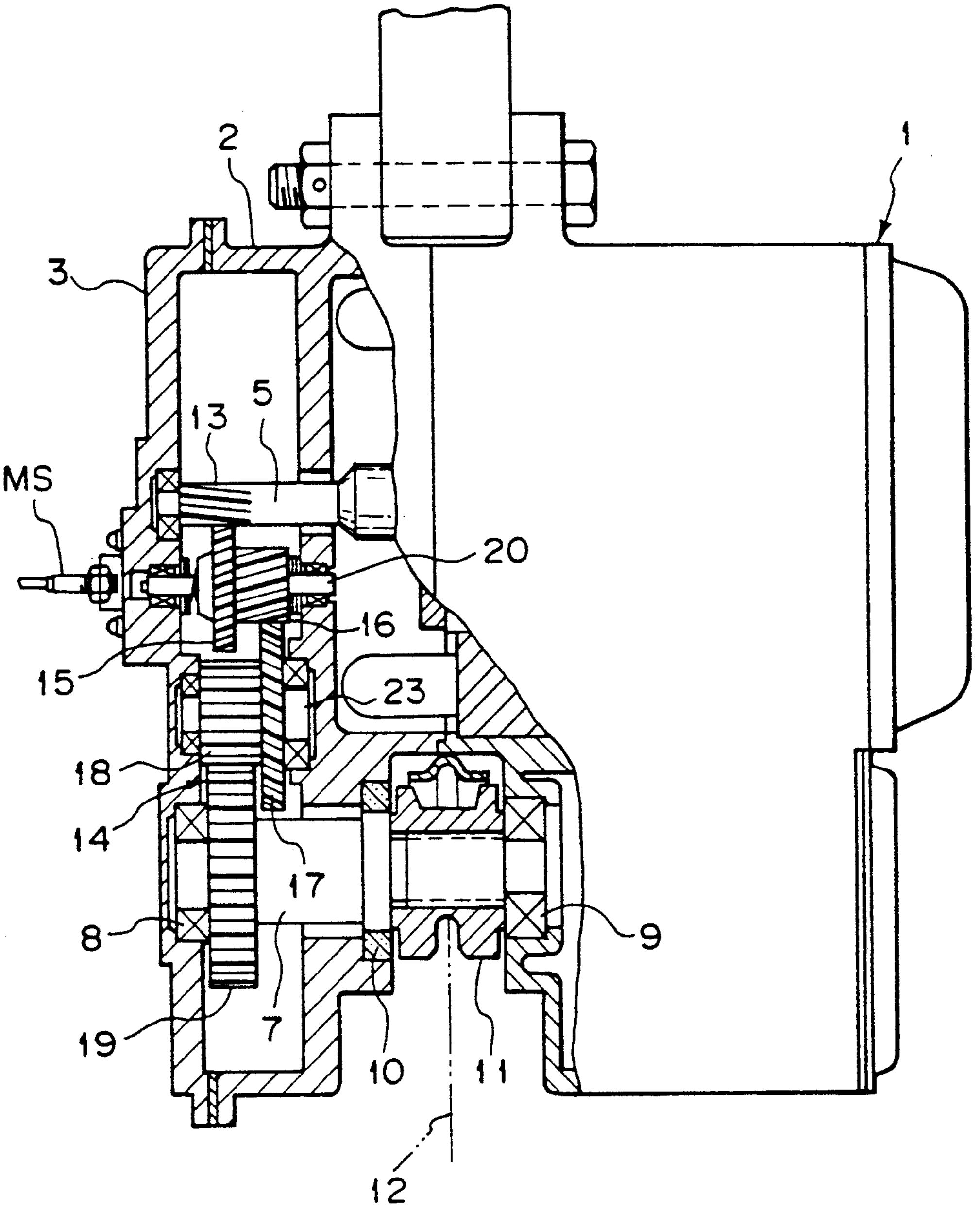
FIG. 7 is a partial cross-sectional side view of another embodiment of a hoist.

FIG. 7 illustrates another embodiment of FIGS. 1 through 5. In FIG. 7, similar components are indicated by the same reference numerals used in FIG. 1.

As illustrated in FIG. 7, in this embodiment, in addition to the helical gear 16, 17, the gear portion 13 of the output shaft 5 and the gear 15 of the first pair of gears are helical gears. The direction of the helical teeth of the helical gear portion 13 and the helical gear 15 is predetermined such that, when there is a load on the load chain 12, a force causing the intermediate shaft 20 to be moved toward the sensor MS is imposed on the helical gear 15 by the helical gear portion 13. Accordingly, in this embodiment, when there is a load on the load chain 12, since the intermediate shaft 20 is caused to move toward the sensor MS by the forces imposed by both the helical gear 17 and the helical gear portion 13, a good response of the movement of the intermediate shaft 20 can be obtained.

Figure 8:
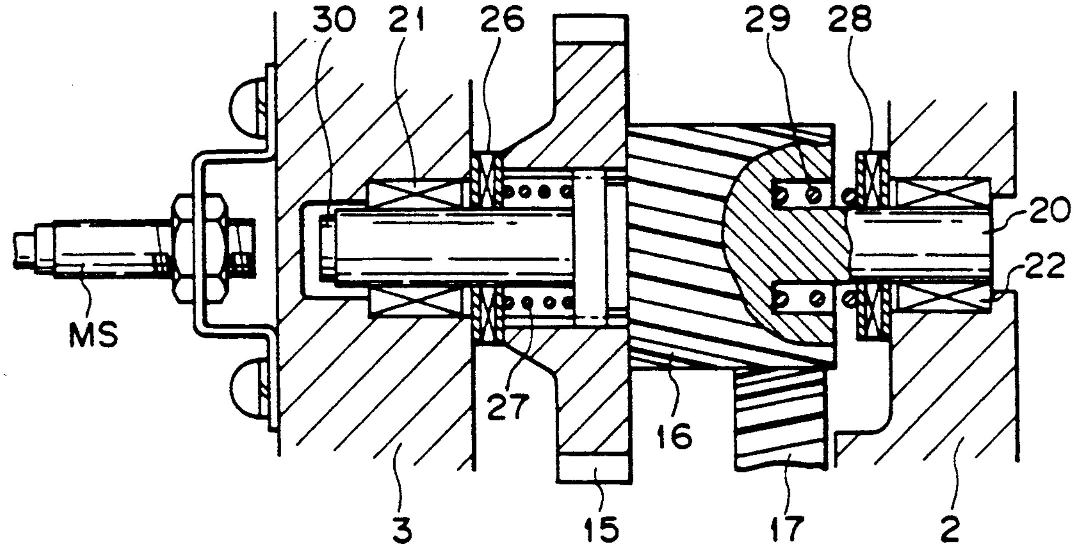
FIG. 8 is an enlarged cross-sectional side view of a portion of a further embodiment of a hoist.

FIG. 8 illustrates a further embodiment of FIGS. 1 through 5. In this embodiment, the compression spring 29 has a stronger spring force than that of the compression spring 27, and thus when there is no load on the hook of the load chain 12, the spur gear 15 is maintained at a position at which it is in contact with the thrust bearing 26. Further, in this embodiment, the direction of the helical teeth of the helical gears 16 and 17 is opposite to that of the teeth of the helical gears 16 and 17 illustrated in FIGS. 1 through 3, respectively, and thus, when there is a load on the chain load 12, the intermediate shaft 20 is caused to move toward the thrust bearing 28. Furthermore, in this embodiment, the sensor MS is constructed such that, when the permanent magnet 30 approaches the sensor MS, the contact MS-a (FIG. 5) is made OFF and the contact MS-b (FIG. 5) is made ON, and that, when the permanent magnet MS is remote from the sensor MS, the contact MS-a is made ON and the contact MS-b is made OFF.

In the embodiments described hereinbefore, the sensor MS is arranged outside of the outer casing 3, and accordingly, an advantage is gained in that the sensor MS will not be damaged by lubricating oil used for lubricating the reduction gear 14.

Figure 9:
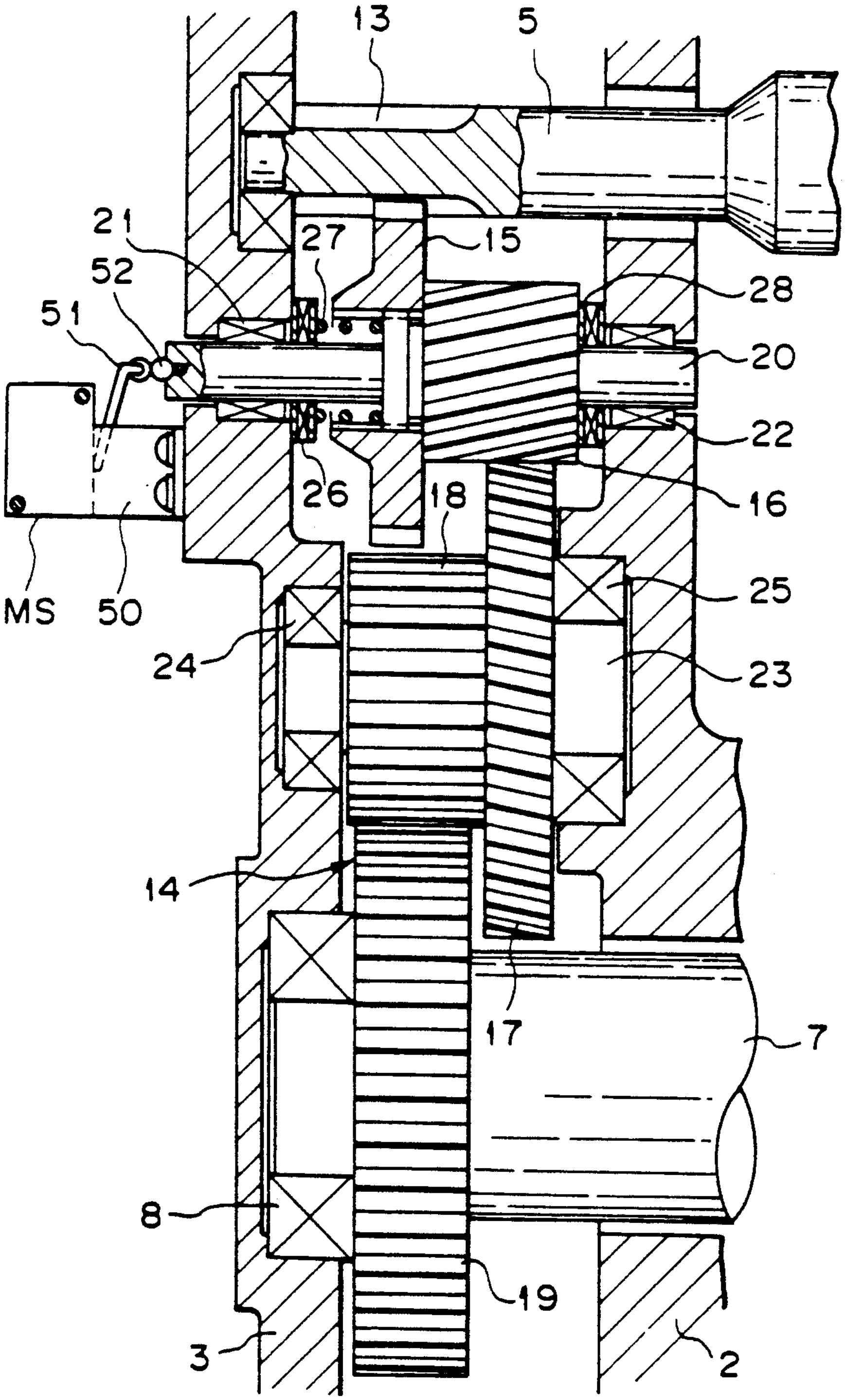
FIG. 9 is a cross-sectional side view of a portion of a still further embodiment of a hoist.

FIG. 9 illustrates a still further embodiment.

In this embodiment, one end of the intermediate shaft 20 projects outward from the outer casing 3. Further, in this embodiment, a limit switch is used as the sensor MS. This limit switch MS is fixed to the outer face of the outer casing 3 via a stay 50, and has an operation lever 51 having a tip portion engageable with a ball member 52 screwed into the projecting tip face of the intermediate shaft 20.

The limit switch MS has two contacts MS-a and MS-b (FIG. 5) actuated by the operation lever 51. When there is no load on the hook of the load chain 12 (FIG. 1), the intermediate shaft 20 is located at a position illustrated in FIG. 9, and this time the contact MS-a is OFF, and the contact MS-b is ON, as illustrated in FIG. 5. Conversely, if there is a load on the load chain 12, the intermediate shaft 20 is moved toward the limit switch MS, and at this time the contact MS-a is made ON and the contact MS-b is made OFF.

Figure 10:
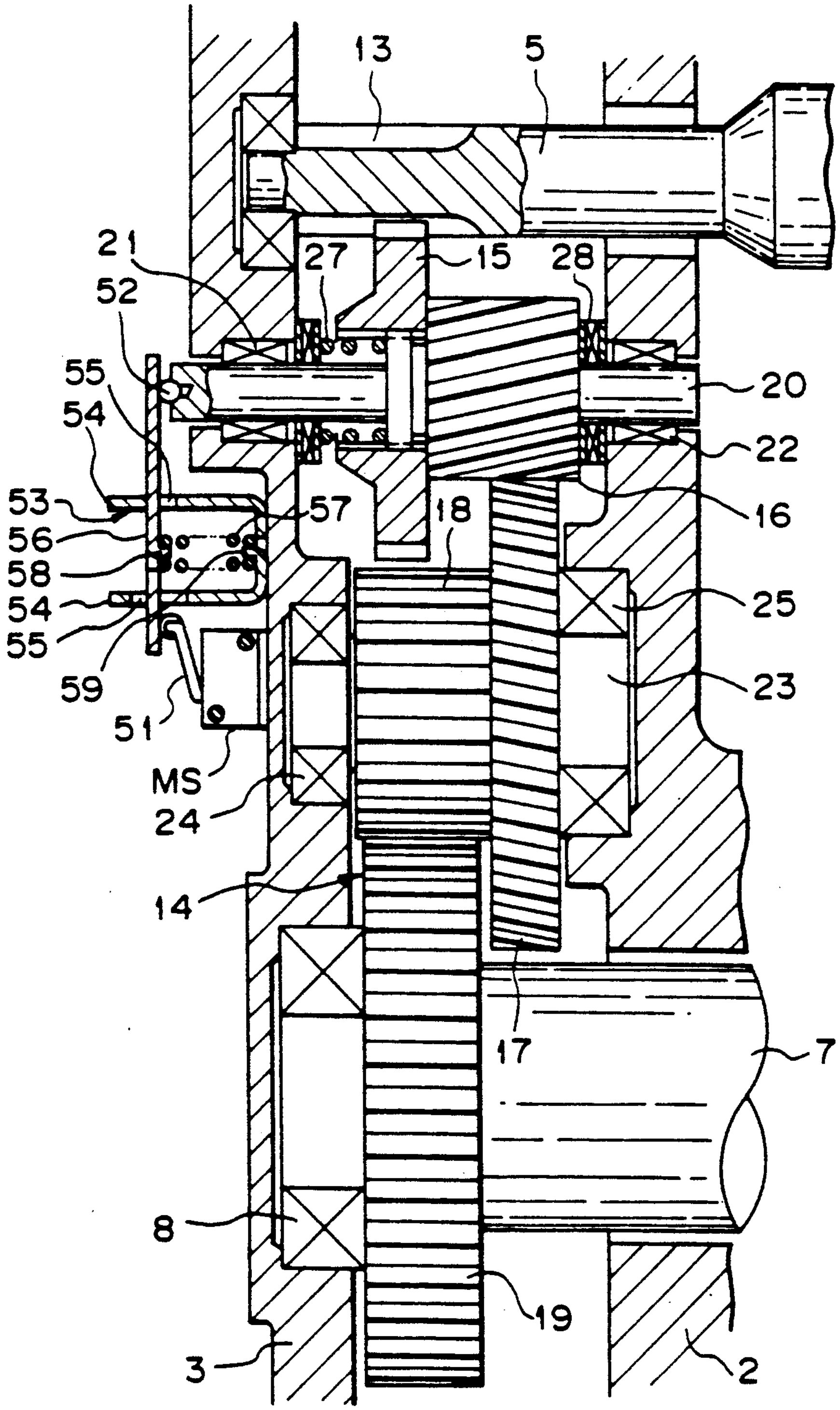
FIG. 10 is a cross-sectional side view of a portion of a still further embodiment of a hoist.
Figure 11:
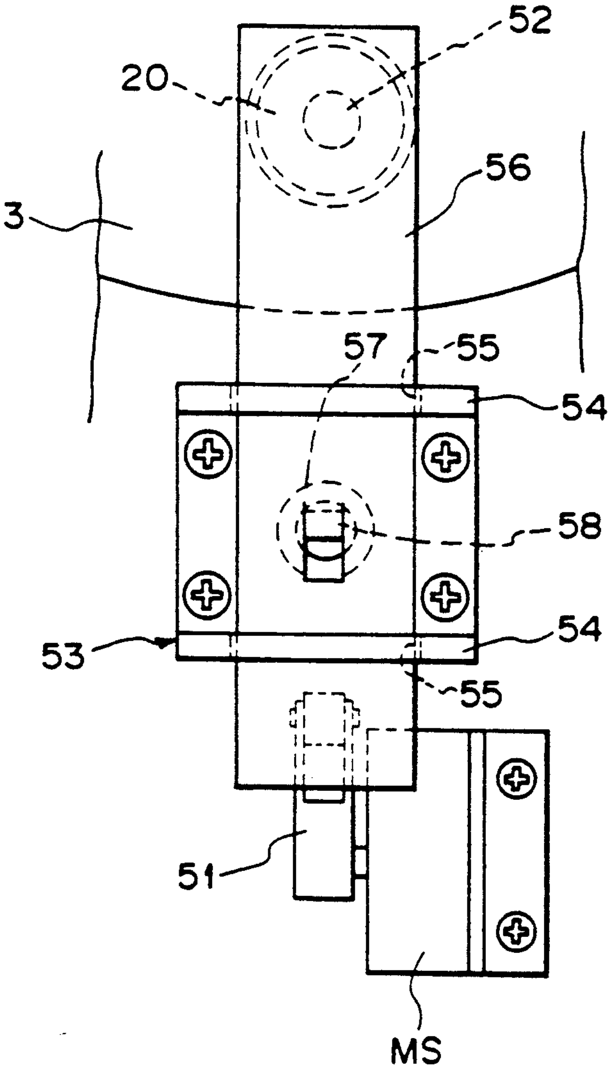
FIG. 11 is an enlarged side view of the hoist illustrated in FIG. 10.

FIGS. 10 and 11 illustrate an alternative embodiment of FIG. 9.

As illustrated in FIGS. 10 and 11, in this embodiment, a U-shaped bracket 53 having two arms 54 is fixed to the outer face of the outer casing 3, and two aligned slots 55 are formed on the corresponding arms 54. An operation plate 56 is arranged to extend through both of the slots 55, and a compression spring 57 is inserted between the operation plate 56 and the base portion of the bracket 53. The compression spring 57 is retained by the projection 58 of the operation plate 56 and the projection 59 of the bracket 53.

As illustrated in FIG. 10, one end of the operation plate 56 is engaged with the ball member 52 of the intermediate shaft 20, and the other end of the operation plate 56 is engaged with the tip of the operation lever 51 of the limit switch MS. In this embodiment, when the intermediate shaft 20 moves toward the operation plate 56, the operation plate 56 is rotated about the higher inner wall of the slot 55. Accordingly, in this embodiment, the limit switch MS is indirectly actuated by the ball member 52 of the intermediate shaft 5. This embodiment has an advantage in that the device for detecting the movement of the intermediate shaft 20 projects outward less than that illustrated in FIG. 9.

Figure 12:
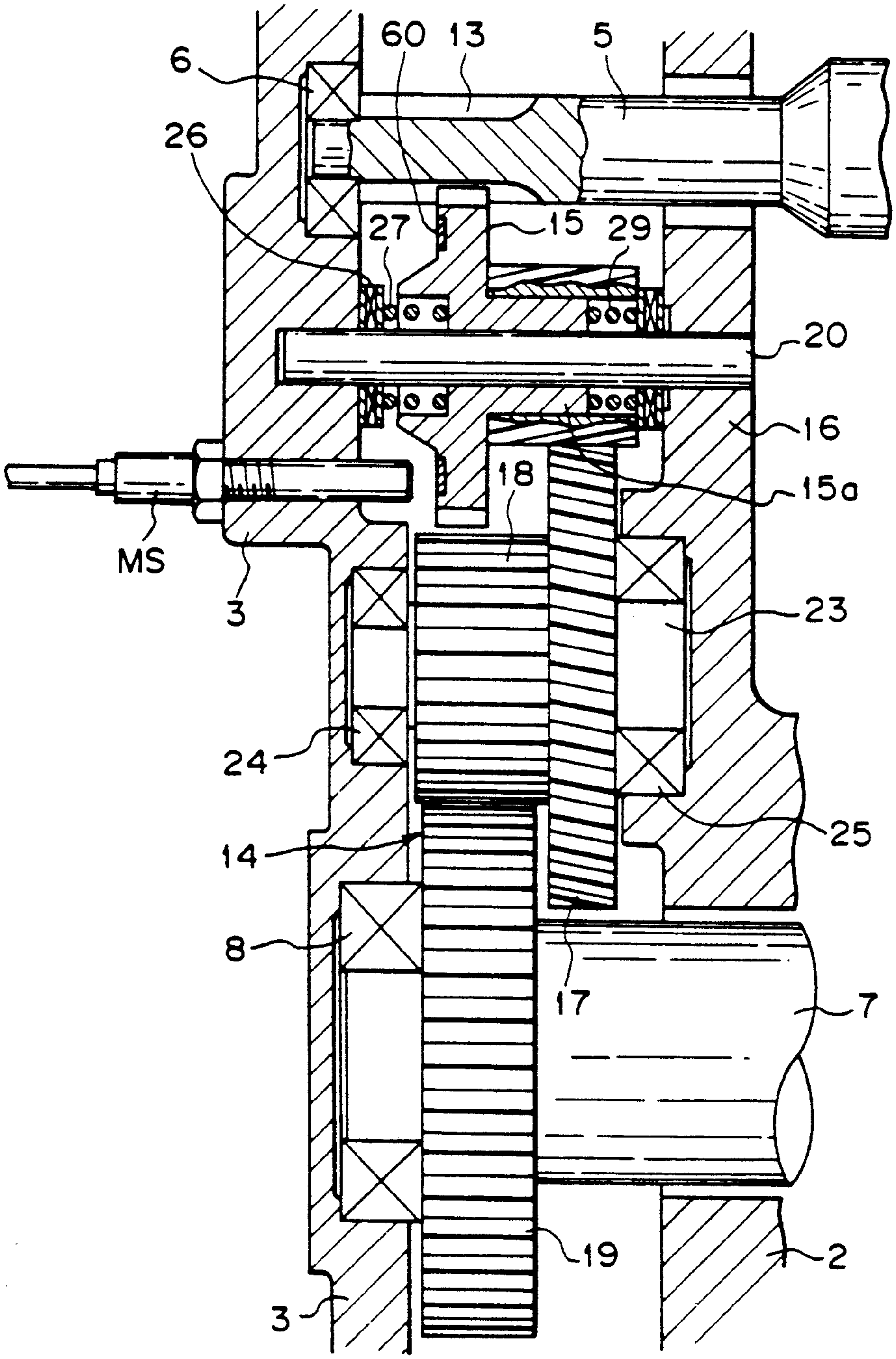
FIG. 12 is a cross-sectional side view of a portion of a still further embodiment of a hoist.

FIG. 12 illustrates a still further embodiment.

In this embodiment, the intermediate shaft 20 is fixed to the inner casing 2 and the outer casing 3, and the gear 15 of the first pair is rotatably inserted to the intermediate shaft 20. The helical gear 16 is press-fitted onto the hub portion 15*a* of the gear 15, so that the helical gear 16 rotates together with the gear 15. In this embodiment, when there is no load on the hook of the load chain 12 (FIG. 1), the gear 15 and the helical gear 16 are located at a position illustrated in FIG. 12, due to the spring force of the compression spring 27. Conversely, when there is a load on the load chain 12, the gear 15 and the helical gear 16 are moved toward the thrust bearing 26.

In this embodiment, a Hall element is used as the sensor MS, and an annular permanent magnet plate 60 is embedded in the side wall of the gear 15. The detecting tip portion of the sensor MS is arranged inside the outer casing 3, so as to face the annular permanent magnet plate 60.

Figure 13:
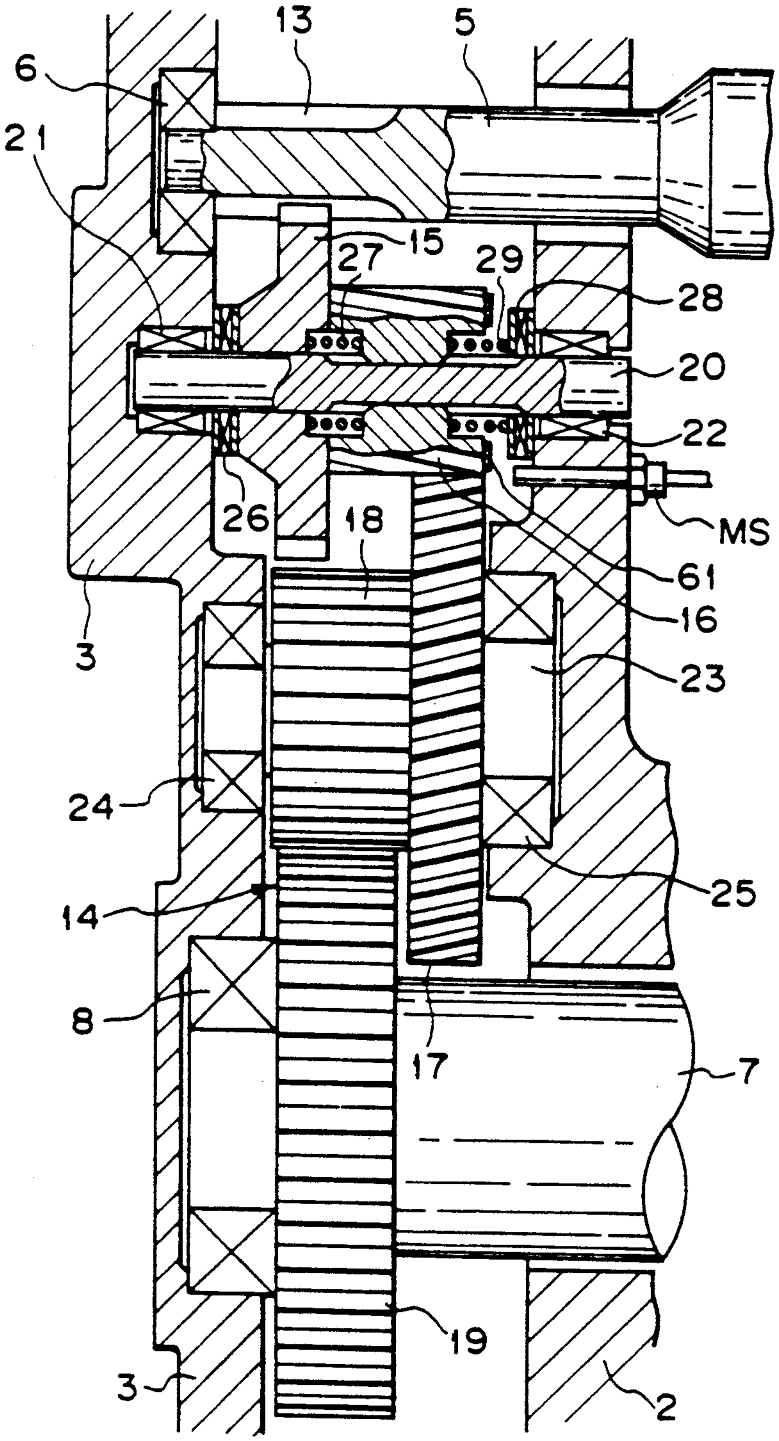
FIG. 13 is a cross-sectional side view of a portion of a still further embodiment of a hoist.

FIG. 13 illustrates a still further embodiment.

In this embodiment, the intermediate shaft 20 is rotatably supported by the bearings 21, 22, and the gear 15 of the first pair is rigidly fixed to the intermediate shaft 20. The helical gear 16 is splined onto the intermediate shaft 20, and thus is able to move in the axial direction thereof. In this embodiment, when there is no load on the hook of the load chain 12 (FIG. 1), the helical gear 16 is located at a position illustrated in FIG. 13, due to the spring force of the compression spring 29. Conversely, when there is a load on the load chain 12, the helical gear 16 is moved toward the thrust bearing 28.

Also, in this embodiment, a Hall element is used as the sensor MS, and an annular permanent magnet plate b1 is fixed to the side wall of the helical gear 16. The detecting tip portion of the sensor MS is arranged inside the outer casing 3, so as to face the annular permanent magnet plate 61.

According to the present invention, it is possible to detect whether or not there is a load on the load chain by using the movement of a part of the reduction gear, with which the electric motor is inherently equipped. Accordingly, the cost of manufacturing the hoist can be reduced, and the size of the hoist will not be made larger.

Although the invention has been described with reference to specific embodiments chosen for purposes of illustration, it should be apparent that numerous modifications could be made thereto by those skilled in the art without departing from the basic concept and scope of the invention.

We claim:

1. An electric hoist comprising:

an electric motor having an output shaft;

a driven shaft for lifting and lowering a load;

a load sheave fixed to said driven shaft for lifting a load chain;

a reduction gear arranged between said output shaft and said driven shaft, said reduction gear comprising at least two helical gears in mesh with each other, one of said helical gears being movable in an axial direction thereof when a load exceeds a predetermined value;

detecting means for detecting the movement of said movable helical gear; and control means for controlling the speed of rotation of said electric motor in response to an output signal from said detecting means for indicating movement of said helical gear, to thereby change the speed of rotation of said electric motor from a higher speed to a lower speed when the weight of the load exceeds said predetermined value, resulting in movement of said movable helical gear.

2. An electric hoist according to claim 1, wherein said movable helical gear is biased by a spring in a direction opposite to the direction in which said movable helical gear is moved when the weight of the load exceeds said predetermined value.

3. An electric hoist according to claim 1, wherein said movable helical gear is biased by a first spring in a direction opposite to the direction in which said movable helical gear is moved when the weight of the load exceeds said predetermined value, and said movable helical gear is biased by a second spring in a direction in which said movable helical gear is moved when the weight of the load exceeds said predetermined value, said first spring having a spring force stronger than that of said second spring.

4. An electric hoist according to claim 1, wherein said reduction gear is arranged in a casing of the hoist and comprises another gear rotating together with said movable helical gear and mounted on a shaft, and a thrust bearing for said other gear is arranged on said shaft between said other gear and an inner wall of said casing, a thrust bearing for said movable helical gear being arranged on said shaft between said movable helical gear and said inner wall of said casing.

5. An electric hoist according to claim 1, wherein said reduction gear comprises another gear fixed, together with said movable helical gear, to a shaft which is rotatable and movable in an axial direction thereof, and said detecting means detects the movement of said shaft.

6. An electric hoist according to claim 5, wherein said output shaft of said electric motor has a gear portion, and said other gear meshes with said gear portion.

7. An electric hoist according to claim 6, wherein said other gear is a spur gear, and said gear portion is a spur gear portion.

8. An electric hoist according to claim 6, wherein said other gear is a helical gear, and said gear portion is a helical gear portion, said helical gear portion moving said other helical gear in an axial direction which is the same direction as that in which said movable helical gear is caused to move by a meshing of the other helical gear with said movable helical gear when the weight of the load exceeds said predetermined value.

9. An electric hoist according to claim 5, wherein said shaft has an end face positioned inside of a casing of said hoist and having a permanent magnet thereon, and said detecting means is arranged outside of said casing and is operated by the magnetic field produced by said permanent magnet.

10. An electric hoist according to claim 9, wherein said detecting means is a sensor operated in response to a change in an intensity of said magnetic field acting on said sensor.

11. An electric hoist according to claim 9, wherein said casing located between said permanent magnet and said detecting means is made of a non-magnetic material.

12. An electric hoist according to claim 5, wherein said shaft has an end portion projecting outward from a casing of said hoist, and said detecting means is arranged so as to cooperate with the end portion of said shaft.

13. An electric hoist according to claim 12, wherein said detecting means comprises a limit switch directly operated by the end portion of said shaft.

14. An electric hoist according to claim 12, wherein said detecting means comprises a limit switch and an operation plate swingably supported by said casing, and said limit switch is operated by the end portion of said shaft via said operation plate.

15. An electric hoist according to claim 1, wherein said reduction gear comprises another gear fixed to said movable helical gear and rotatably and axially movably inserted on a shaft fixed to a casing of the hoist, and said detecting means detects the movement of said other gear and said movable helical gear.

16. An electric hoist according to claim 15, wherein said detecting means has a detecting tip portion arranged inside of said casing and facing a side wall of one of said other gear and said movable helical gear.

17. An electric hoist according to claim 16, wherein said side wall has a permanent magnet thereon, and said detecting means is a sensor operated by the magnetic field produced by said permanent magnet.

18. An electric hoist according to claim 1, wherein said reduction gear comprises another gear fixed to a shaft rotatable in a casing of the hoist, and said movable helical gear is axially movably inserted on said shaft, said detecting means detecting the movement of said movable helical gear.

19. An electric hoist according to claim 18, wherein said detecting means has a detecting tip portion arranged inside of said casing and facing a side wall of said movable helical gear.

20. An electric hoist according to claim 19, wherein said side wall has a permanent magnet thereon, and said detecting means is a sensor operated by the magnetic field produced by said permanent magnet.

21. An electric hoist according to claim 1, wherein said reduction gear comprises a first shaft and a second shaft arranged between said output shaft and said driven shaft, in parallel to said output shaft and said driven shaft, and said output shaft having a gear portion, said driven shaft having a gear fixed thereto, said reduction gear further comprising a gear meshing with the gear portion of said output shaft and rotating on said first shaft together with said movable helical gear, and a gear meshing with said gear of said driven shaft and rotating on said second shaft together with other helical gear meshing with said movable helical gear.

22. An electric hoist according to claim 1, wherein said electric motor comprises high speed input terminals and low speed input terminals, and said control means connects said high speed input terminals to a power source for rotating said electric motor at a higher speed when the weight of the load is lower than said predetermined value, and said control means connects said low speed input terminals to the power source for rotating said electric motor at a lower speed when the weight of the load exceeds said predetermined value.

23. An electric hoist according to claim 22, wherein said control means comprises a self-retaining contact which remains ON after said detecting means has detected that the weight of the load exceeds said predetermined value, to thereby continue to connect said low speed input terminals to the power source.

* * * * *